United States Patent [19]

Hamilton

[11] Patent Number: 4,968,192

[45] Date of Patent: Nov. 6, 1990

[54] TREPANNING TOOL

[76] Inventor: Martin N. Hamilton, R. D. #4, Middle Rd., Meadville, Pa. 16335

[21] Appl. No.: 462,214

[22] Filed: Jan. 9, 1990

[51] Int. Cl.$^5$ ............................................. B23B 17/24
[52] U.S. Cl. ....................................... 408/144; 407/33; 408/188
[58] Field of Search ...................... 408/203.5, 204, 206, 408/144, 227, 231, 232, 703, 144, 187, 188; 407/33; 125/20

[56] References Cited

U.S. PATENT DOCUMENTS 4,767,245 8/1988 Shoji et al. ........................... 408/204

Primary Examiner—Frederick R. Schmidt
Assistant Examiner—Lawrence Cruz
Attorney, Agent, or Firm—Charles L. Lovercheck; Wayne L. Lovercheck; Dale Lovercheck

[57] ABSTRACT

A trepanning tool having a hollow, cylindrical body having a central axis with a drive means on one end and a means supporting cutting inserts on the other end. The cutting inserts are arranged to cut in groups of three. Each insert has at least one generally straight cutting edge, the second insert of each said group being disposed generally perpendicular to the central insert, the cutting edge of the first and third insert each being disposed at an acute angle in a vertical plane to the cutting edge of the first insert whereby the three inserts cut a concave circular groove as the tool rotates.

8 Claims, 2 Drawing Sheets

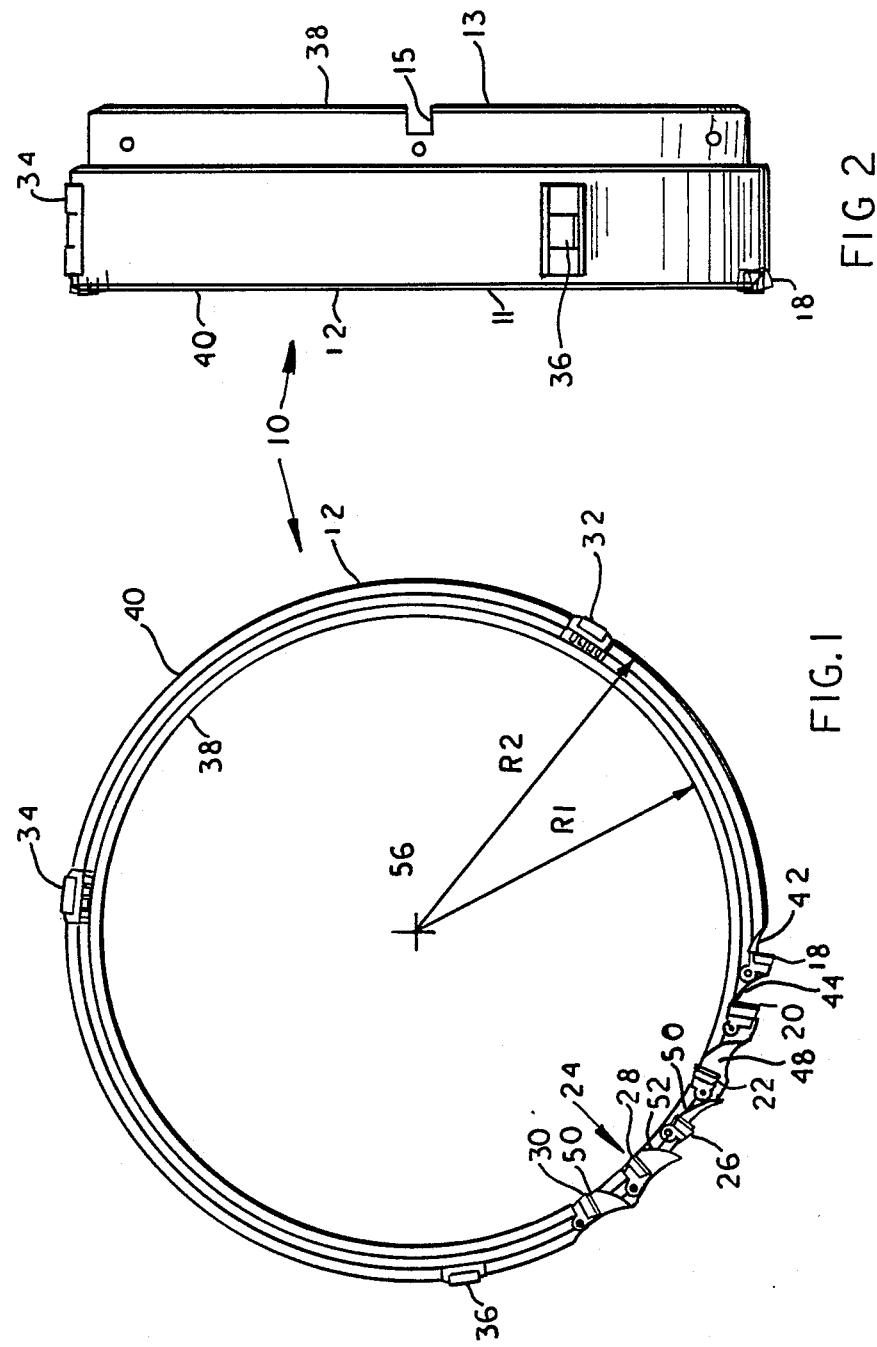

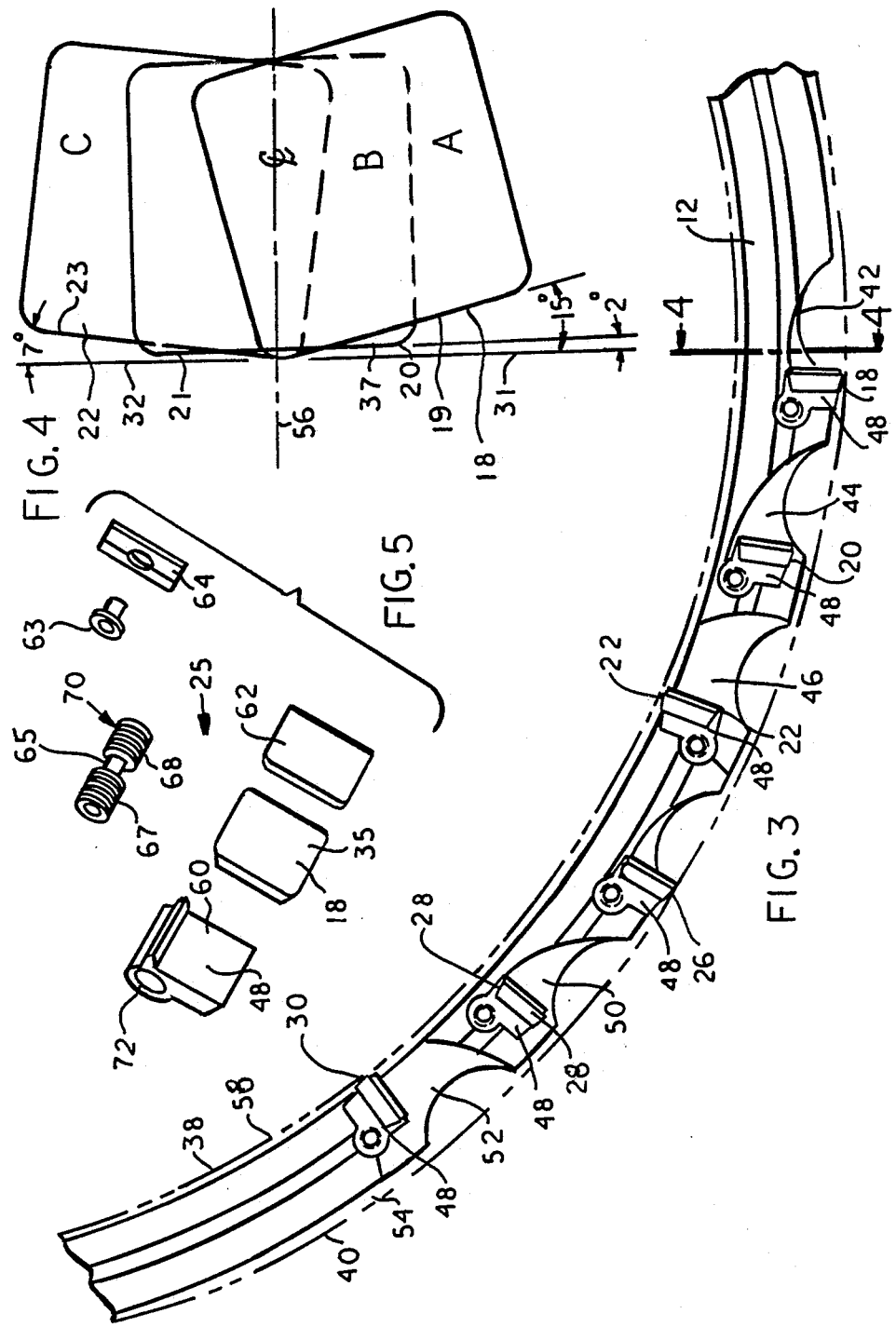

TREPANNING TOOL

BACKGROUND OF THE INVENTION

The invention relates to an indexing, trepanning tool having an improved arrangement of cutter inserts for cutting a cylindrical hole in workpieces.

Trepanning tools are used for boring relatively large holes in workpieces. The present invention utilized indexable inserts which cut in a unique manner to form the bored trepan hole.

OBJECTS OF THE INVENTION

It is an object of the present invention to provide a trepanning tool having indexable cutting inserts which are held in cutting position in the secure manner designed to more effectively balance and direct cutting forces and improve cutting efficiency.

Another object of the invention is to provide a trepanning tool wherein the cutting inserts are used in combination with one another for cutting holes in workpieces.

These and other objects are achieved by employing an improved arrangement of cutting inserts and an improved mounting arrangement for the indexable cutting inserts on the cutting face of the hollow cylindrical body.

With the above and other objects in veiw, the present invention consists of the combination and arrangement of parts hereinafter more fully described, illustrated in the accompanying drawing and more particularly pointed out in the appended claims, it being understood that changes may be made in the form, size, proportions and minor details of construction without departing from the spirit or sacrificing any of the advantages of the invention.

BRIEF DESCRIPTION OF THE DRAWINGS

FIG. 1. is an end view of the trepanning tool according to the invention.

FIG. 2. is a side view of the trepanning tool shown in FIG. 1.

FIG. 3. is an enlarged partial end view of the cutter arrangement according to the invention.

FIG. 4. is an enlarged partial view taken on line 4—4 of FIG. 3 showing the relative position of the cutting inserts.

FIG. 5. is an exploded view of the clamps for clamping the inserts.

DETAILED DESCRIPTION OF THE DRAWING

Now with more particular reference to the drawings, a rotary cutting trepanning tool 10 is shown comprising hollow cylindrical body 12. Body 12 has first end 11 and second end 13. Second end 13 has driving means 15 for connecting a suitable drive. Body 12 has first cutting insert 18, second cuting insert 20, third cutting insert 22, fourth cutting insert 26, firth cutting insert 28 and sixth cutting insert 30. Cutting inserts 18, 20, 22, 26, 28 and 30 are each supported on body 12 in cutting assembly support 24 shown in an exploded view of FIG. 5.

As body 12 of trepanning tool 10 is rotated, first cutting insert 18 and fourth cutting insert 26 cut a workpiece along an outer circular path 40 and third cutting insert 22 and sixth cutting insert 30 cut the workpiece along inner circular path 38. Second cutting insert 20 and fifth cutting insert 28 cut the workpiece along an intermediate circular path between outer circular path 40 and inner circular path 38.

Cutting assembly supports 24 may each incorporate an indexable insert of the general type shown in U.S. Pat. No. 4,309,133 issued to Martin N. Hamilton on Jan. 5, 1982.

First, second, third, fourth, fifth and sixth cutting inserts 18, 20, 22, 26, 28 and 30 each have lower cutting edge 25 which cut in a circular path on the workpiece as the tool rotates. Lower cutting edge 23 of third cutting insert 22 and sixth cutting insert 30 cut the workpiece in circular area 58. Inner circular path 38 is a circle having a radius with a center at the center of cutting trepanning tool 10. Outer circular path 40 is likewise a circle having a center at the center of hollow cylindrical body 12.

Cutting edge 19 of first cutting insert 18 is disposed at an angle of about 15 degrees to horizontal reference plane 31-32, which is perpendicular to central axis 56 of body 12. Cutting edge of cutting insert 22 is disposed at an angle of about 7 degrees to the perpendicular to center axis 56 of body 12. Cutting edge 21 of cutting insert 20 is disposed at an angle of about 2 degrees to a perpendicular to center axis 56 of body 12. Cutting edge 19 of first cutting insert 18 and cutting edge 23 of third insert 22 intersect plane 31-32 on trough central axis 156 of the insert 22.

First wear pad 32, second wear pad 34 and third wear pad 36 are supported on body 12 in a manner familiar to those skilled in the art.

Each cutting assembly support 24 is generally made up of the particular insert 18, 20, 22, 26, 28 or 30 which rests between locking wedge 60 and chip breaker plate 62. Chip breaker plate 62 and insert support plate 64 are received in notch 42 and held in place by wedge screw 70.

Insert support plate 64 is placed in the bottom of notch 42 and held in place by screw 63. Wedge 60 and chip breaker plate 62 are inserted in slot 66 with one of inserts 18, 20, 22, 26, 28 and 30 between them. The insert is then locked in place by wedge screw 70 which has first threads 67 and second threads 68 separated by space 65. Firsts threads 67 engage a first thread in threaded hole 72 in wedge 60 while second threads 68 engage a second threaded hole in body 12. First threads 67 and second threads 68 are either of a different pitch or have different handed threads so that tightening screw 70 pulls wedge 60 down into slot 66.

Cutting assemblies support 24 support cutting inserts 18, 20, 22, 26, 28 and 30 and is received in notches 42, 44, 46, 48, 50 and 52. Notch 42 is inclined with respect to central axis 56 to hold the lower edge of second cutting insert 20 and fifth cutting insert 28 are perpendicular to the central axis 56 and parallel to a surface parallel to central axis 56.

First cutting insert 18 and fourth cutting insert 26 are supported so that they cut along a surface which may incline backward and upward at an angle of, for example, 15 degrees to the letter of the cut made by first cutting insert 18 and fourth cutting insert 26. Third cutting insert 22 and sixth cutting insert 30 may be set so that their cutting edge cuts approximately 7 degrees to the cut made by second cutting insert 20 and fifth cutting insert 28 and approximately 7 degrees to the cut make by first cutting insert 18 and fourth cutting insert 26. Inserts 18 through 28 together cut a path thast resembles a flat bottomed annular surface with side edges diverging upwardly and outwardly.

The foregoing specification sets forth the invention in its preferred, practical forms but the structure is shown is capable of modification within a range of equivalents without departing from the invention which is to be understood is broadly novel as is commensurate with the appended claims.

The embodiments of the invention in which an exclusive property or privilege is claimed are defined as follows:

1. A rotary cutting tool comprising a hollow cylindrical body having a first end, a second end, a central axis of rotation disposesd generally perpendicular to a reference plane, a first indexable cutting insert, a second indexable cutting insert and a third indexable cutting insert,
    said first indexable cutting insert having a first cutting edge extending from said reference plane at a first acute angle and radially outwardly from said central axis of rotation,
    said second indexable cutting insert having a second cutting edge disposed substantially in said reference plane,
    said third indexable cutting insert having a third cutting edge extending from said reference plane at a third acute angle and radially inward toward said axis of rotation,
    first support means supporting said first indexable cutting insert on said second end of said body,
    second support means supporting said second indexable cutting insert on said second end of said body,
    third support means supporting said third indexable cutting insert on said second end of said body,
    said first, second and third support means being circumferentially spaced from one another supporting said inserts on said body in circumferential spaced relation to one another,
    whereby said first, second and third inserts together cut a circular groove substantially in the form of a trough concentric to said central axis of rotation having a generally flat bottom lying substantially in said reference plane and a first side extending upwardly and from said reference plane away from said central axis of rotation and a second side extending from said reference plan and away from said first end.

2. The tool recited in claim 1 wherein each said cutting insert has a generally linear cutting edge [19,21] and each said cutting edge is disposed generally parallel to a radii of said body [12].

3. The tool recited in claim 2 wherein said support means for said cutting inserts comprises spaced notches in said hollow cylindrical body,
    each said notch receiving one of said inserts,
    a hollow, cyclindrical part having a wedge attached thereto,
    a screw urging said wedge to lock said insert in said notch.

4. The tool recited in claim 1 wherein said first acute angel is about 15 degrees and said third acute angle is about 7 degrees.

5. The tool recited in claim 3 wherein a fourth, fifth and sixth insert each having generally straight sides are disposed in generally circular paths having a radius approximately equal to said trough cut by said first, second and third inserts and circumferentially spaced from said first, said second and said third inserts.

6. The tool recited in claim 4 wherein said inserts are generally rectangular in shape.

7. The tool recited in claim 1 wherein saidfirst acute angle is approximately 15 degrees,
    said second acute angle is about 7 degrees,
    said third cutting edge is disposed at an acute angle of about 2 degrees to said plane whereby a groove with a generally flat bottom and an outer bottom part incline at about 15 degrees and have an inner bottom.

8. The tool recited in claim 1 wherein a fourth indexable cutting insert, a fourth, a fifth and a sixth indexable cutting insert having a fourth cutting edge, a fifth cutting edge and a sixth cutting edge respectively are attached to said second end of said body,
    said fourth indexable cutting insert having a fourth cutting edge extending from said reference plane at a first acute angle and radially outwardly from said central axis of rotation,
    said fifth endexable cutting insert having a fifth cutting edge disposed substantially in said reference plane whereby said fourth, fifth and sixth cutting inserts cut in said trough cut by said fourth, second and third inserts.

* * * * *